Oct. 30, 1962     R. R. KEGG     3,061,664
GLASS-TO-METAL SEALS AND METHOD OF FABRICATING SAME
Filed Nov. 13, 1959
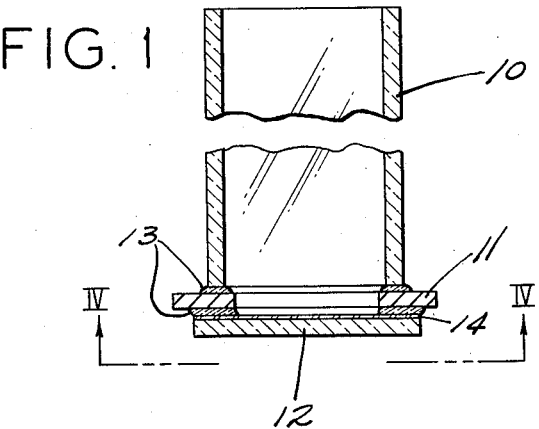
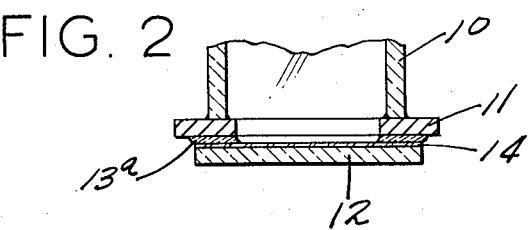
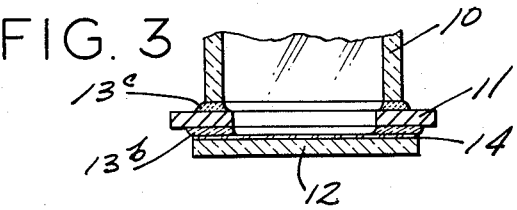
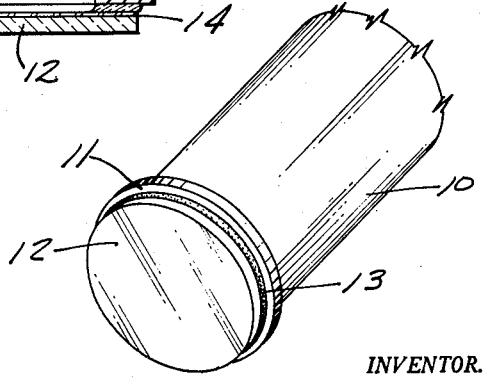
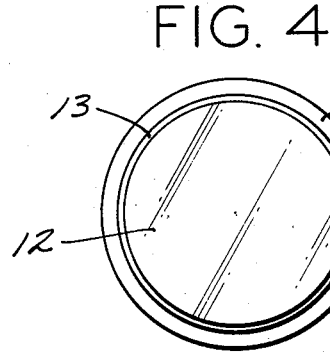
INVENTOR.
ROBERT R. KEGG
BY W. A. Schaich &
E. J. Holler
ATTORNEYS United States Patent Office 3,061,664
Patented Oct. 30, 1962

3,061,664
GLASS-TO-METAL SEALS AND METHOD
OF FABRICATING SAME
Robert R. Kegg, Toledo, Ohio, assignor to Kimble Glass
Company, a corporation of Ohio
Filed Nov. 13, 1959, Ser. No. 852,710
2 Claims. (Cl. 174—50.53)

The present invention relates to glass-to-metal seals and to methods of making same and particularly to seals which are electrically conductive in nature between thin metallic films deposited on glass and rigid metal parts which are integrally bonded together.

Heretofore, in the fabrication of glass-to-metal seals having a thin electrically conductive film adjacent thereto the relatively high temperatures necessary to effect thermal bonding of the glass and metal parts have normally required that the conductive film be deposited after the seal is effected. If the conductive film is deposited on the glass part prior to fusion sealing of the glass and metal parts the joining temperatures are usually of such severity that the conductive film is either disrupted or destroyed.

In the manufacture of image orthicon tubes it is frequently necessary that the device be provided with a light-transmitting window having an internal surface which is coated with a thin electrically conductive film. Such tubes are utilized in television cameras to convert an optical image into an electronic image for telecasting purposes. Their basic structure is well known to those skilled in the electronic art of television broadcasting and needs no detailed amplification in this disclosure.

Briefly, the orthicon tube generally consists of a glass envelope having a planar front end or face plate member. The inner surface of the face plate comprises a photo-cathode usually consisting of a thin, continuous, semi-transparent film of cesium, silver or silver oxide, for example. A target is conventionally mounted internally spaced from the photo-cathode, these elements comprising the image-forming section of the tube.

It is sometimes necessary that external electrical contact be made with the internal conductive photo-cathode film such as by a rigid annular ring which surrounds and is contiguous with the window area. In the fabrication of one form of such device a metallic ring, for example one comprised of "Kovar" alloy, is initially sealed between a peripheral area of the face plate member and the annular terminating edges of a tubular body. The internal surface of the face plate is then coated with a conductive film by working through the tubular body member. Due to the inaccessibility of this inner surface where the tubular body member is of appreciable length it is exceedingly difficult to deposit the conductive film with the requisite degree of uniformity and having proper electrical and light-transmitting characteristics. When conventional seals are made between the metallic ring and face plate employing normally non-conducting vitreous or devitrifying solder glasses or ceramic glazes, electrical continuity between the ring and inner film must be obtained by some form of separate conductor element. The ring cannot be sealed directly to the film as by thermal fusion to form a vacuum-tight seal without extremely great care to maintain and protect the film. This invention obviates this problem and providing a unique glass-to-metal seal and method of fabricating same.

Accordingly, it is an object of the present invention to provide a vacuum-tight glass-to-metal seal which is electrically conductive for positive electrical interconnection between a metallic member and a conductive coating on a surface of a glass member.

Another object of this invention is to provide an electrically conductive glass-to-metal seal for electrical connection between a thin electrically conductive film and a rigid metallic member which is adapted to fabrication at minimized temperatures.

Another object of this invention is to provide a method of fabricating an electrically conductive hermetic glass-to-metal seal contiguous with an electrically conductive film on an inner surface of a glass member by the utilization of a low-melting electrically conductive soft glass.

Another object of this invention is to provide a composite article such as an image orthicon tube envelope having a tubular glass body portion and a light-transmitting window portion, an electrically conductive film over an inner surface of the said window portion, the several glass portions being joined by an externally projecting metallic ring and an annular layer of low-melting conductive solder glass adapted to provide electrical continuity through the seal.

The specific nature of this invention, as well as other objects and advantages thereof, will become apparent to those skilled in the art from the following detailed description taken in conjunction with the annexed sheet of drawings on which, by way of preferred example only, are illustrated the preferred embodiments of this invention.

On the accompanying drawings:

FIG. 1 shows in a vertical sectional view one sealed end of an electronic tube envelope embodying the present invention.

FIG. 2 is a view similar to FIG. 1 showing a modified form of the seal area.

FIG. 3 is a view similar to FIG. 2 showing another modification of the seal area.

FIG. 4 is an end view of the tube envelope taken along the line 4—4 of FIG. 1.

FIG. 5 is a perspective view of the image-transmitting window portion of the tube envelope embodying the invention.

Referring to the drawing and FIG. 1 in particular the numeral 10 designates a tubular glass body member which is essentially right-cylindrical as shown. The upper end of the envelope is adapted to contain and be sealed by a plurality of electronic components (not shown) which are known in the art and of no particular concern with regard to my invention. The lower end of the envelope is sealed by several glass and metal parts with which this invention is directly concerned.

A plane glass face plate 12 having a diameter slightly greater than that of the envelope 10 is utilized as an end face closing member to seal the lower end of the envelope. An essentially rigid metallic ring 11 is interposed between the sealing surfaces of the tube end and face plate 12. An example of a material having a suitable coefficient of thermal expansion is that with the trade name "Kovar." Kovar is a glass sealing metallic alloy consisting of 20% nickel, 17% cobalt, 0.2% manganese and the balance iron, and has a coefficient of thermal expansion essentially the same as certain hard or base glasses adapted to electronic use.

In one form of the invention as shown in FIG. 1 the inner surface of glass face plate 12 is provided with a conductive coating 14 such as silver, silver oxide, cesium, tin, tin oxide, or a mixture of tin and antimony oxides or the like, of suitable thickness having the requisite electrical and light-transmitting characteristics. The coating is preferably utilized over the full inner and peripheral sealing surfaces of the disc member and is applied in an independent operation by one of several film-forming procedures known in the art.

Metallic ring member 11 is fabricated with annular sealing surfaces adapted to be interposed between the terminating end of main body member 10 and a peripheral region of face plate 12. In the form of the invention shown in FIG. 1 two individual layers 13 of low-melting solder glass are interposed between the several glass members on both sides of metallic ring member 11. Solder glass 13 is comprised of either a vitreous or a devitrifying type material having thermal expansion properties in suitable agreement with the base glass and metallic parts. The low-melting solder glass preferably has a softening temperature not in excess of about 450° C. Also the solder glass has the property of being electrically conductive to facilitate the passage of electrical current between metallic ring member 11 and conductive film 14.

The solder glass is utilizable in several ways to effect the joint, such as by first coating the opposing sealing surfaces of ring 11 with the solder glass in powder form compounded as a paste or dispersed within a suitable carrying vehicle. The solder glass is fused to the sealing surfaces of the ring member in a separate operation to eliminate the vehicle and then the several glass parts are juxtaposed on opposite sides thereof in proper alignment. The solder glass is then thermally softened to wet and fuse to the end surface of tubular member 10 and the conducting film 14 on face plate 12. The solder glass has a softening point temperature below which the film 14 is volatilized or adversely affected by thermal exposure thereto. Also its softening temperature is below the annealing point temperatures of the base glass parts. Thus, the seal can be formed without imparting objectionable sealing stresses into the joint on cooling.

In a modified form of the invention as shown in FIG. 2 ring 11 is initially fused to the end portion of body member 10 by direct glass-to-metal fusion. A layer 13a of low-melting conductive solder glass is then interposed between the ring 11 and face plate 12 in contact with film 14. The solder glass is heated and thermally fused to effect vacuum-tight bonding between the several parts.

In still another modified form of the invention as shown in FIG. 3 several different types of low-melting solder glass as indicated by layers 13b and 13c are utilized on opposite sides of metallic sealing ring 11. Both of the low-melting sealants are compatible in thermal expansion characteristics with the glass and metal members to permit durable vacuum-tight sealing of the tube envelope 10. Layer 13b is comprised of a conductive solder glass while 13c may be either conductive or non-conductive as required. The seal is effected by either bonding metallic ring 11 to filmed face plate member 12 in a separate operation and then bonding the ring to tubular body member 10 by means of layer 13c, or alternatively bonding the parts in the reverse order. In any event an electrically conductive sealant is employed to provide layer 13b for electrical continuity between film 14 and ring 11.

In the table set forth below several distinctive types of low-melting solder glasses utilizable in the present invention are shown. The solder glasses preferably have a fiber softening temperature below 450° C. to permit bonding the parts into an essentially stress-free joint.

The solder glasses are:

*Table I*

|  | A | B | C |
|---|---|---|---|
| PbO _____ percent__ | 71.90 | 61.90 | 67.22 |
| B₂O₃ _____ do____ | 8.44 | 13.31 | 14.52 |
| P₂O₅ _____ do____ | 12.11 | | |
| SiO₂ _____ do____ | 1.89 | 1.92 | 1.90 |
| ZnO _____ do____ | | 18.10 | 8.93 |
| CuO _____ do____ | | | 1.77 |
| Ag _____ do____ | 5.66 | 4.53 | 5.66 |
| Beta-eucryptite (LiAlSiO₄) __ do____ | | | .24 |
| Total _____ do____ | 100.00 | 100.0 | 100.00 |
| Coeff. of Expansion (0–300° C.) × 10⁻⁷_ | 101 | 78 | 98 |
| Fiber Softening Pt.—° C _____ | 375 | 425 | 421 |
| Density (gms./cc.) _____ | 6.429 | 5.5793 | |
| Resistivity @ 24° C (ohm-cm.) _____ | .005–.010 | 1.7 | 0.34 |

Examples A and B are solder glasses which have characteristics of being essentially vitreous materials as prepared, but which change to essentially non-glassy, crystalline materials when held for an appreciable period at the sealing temperature. These materials are referred to as devitrifying-type solder glasses. Example C is a vitreous type of solder glass which retains its vitreous non-crystalline nature after effecting a seal therewith.

All of the representative solder glasses are first prepared in vitreous form without the inclusion of silver or other metal or the combined silver metal and beta-eucryptite indicated in Example B. After the materials are melted into fully homogeneous form, they are pulverized into powder form and the metal and/or metal and beta-eucryptite is added to give the base material electrically conductive properties for subsequent sealing.

The following glass compositions are typical of those which are utilized as base glass components for sealing with either vitreous or devitrifying types of solder glasses:

*Table II*

|  | 1 | 2 | 3 |
|---|---|---|---|
| SiO₂ _____ | 56.13 | 67.7 | 64.7 |
| Al₂O₃ _____ | 1.39 | 2.8 | 4.9 |
| Na₂O _____ | 4.59 | 15.1 | 7.2 |
| K₂O _____ | 8.35 | 1.2 | |
| CaO _____ | 0.08 | 5.6 | 0.1 |
| MgO _____ | 0.03 | 4.0 | |
| PbO _____ | 29.48 | | |
| Fe₂O₃ _____ | 0.02 | 0.07 | 0.07 |
| As₂O₃ _____ | 0.09 | | 0.2 |
| Sb₂O₃ _____ | | | 0.2 |
| CeO₂ _____ | | | 0.4 |
| B₂O₃ _____ | | 1.5 | 22.3 |
| BaO _____ | | 2.1 | |
| Total _____ | 100.07 | 100.07 | 100.00 |
| Thermal Expansion (0–300° C.) × 10⁻⁷__ | 92.5 | 92 | 50 |
| Fiber Softening Pt. (° C.) _____ | 622 | 705 | 705 |
| Annealing Pt. (° C.) _____ | 425 | 524 | 500 |
| Strain Pt. (° C.) _____ | 395 | 495 | 469 |

Summarily, the present method of making an electrically conductive glass-to-metal seal at minimal temperatures comprises firmly bonding a thin film of electrically conductive material to a base glass surface contiguous with its sealing area, juxtaposing an essentially rigid metallic member adjacent the film on said base glass member and interposing a fused layer of low-melting electrically conductive solder glass between said rigid glass member and said conductive film to form a vacuum-tight conductive seal. The method also encompasses forming such seal at a sealing temperature not in excess of about 450° C. by the use of low-melting conductive solder glass which is either of the vitreous or devitrifying type and having thermal expansion characteristics in substantial agreement with the base glass and rigid metallic members.

The glasses referred to above as "hard" or "base" glasses are higher-melting than the low-melting solder glasses and are adapted to retain a prefabricated shape and form in the application of the sealing compositions on sealing.

While obviously many widely divergent embodiments of the present invention may be made without departing from the spirit and scope thereof as described, it is to be understood that the invention is not limited to the specific embodiments except as defined by the appended claims.

I claim:

1. A glass-to-metal seal comprising, in combination, a hollow tubular hard glass body member terminating in an annular sealing surface, a flat metallic ring member consisting of an iron base alloy fusedly attached to said sealing surface, an end-closing hard glass window member consisting of a flat disc having a thin electrically conductive film over at least its sealing surface adapted to be joined to said ring member, and an intermediate annular layer of low-melting electrically conductive solder glass having a working point temperature not in excess of 450° C. fusedly interposed in essentially devitrified form between said conductive film on said window member and said ring member to form a vacuum-tight electrically conductive seal therebetween.

2. A composite article having a glass-to-metal seal comprising a tubular hard glass body member terminating in an annular sealing surface, a flat metallic ring member fusedly attached to said annular sealing surface, an end closing hard glass window member consisting of a flat disc adapted to be joined to said metallic ring member, a thin film of electrically-conductive metallic material extending over the light-transmitting interior surface of said window member, and an intermediate layer of low-melting electrically-conductive solder glass having a fiber softening point temperature not in excess of 450° C. fusedly interposed in essentially devitrified form between said window member and said ring member in contact with said conductive film to form a vacuum-tight electrically conductive seal between said ring member and said conductive film.

References Cited in the file of this patent

UNITED STATES PATENTS

| | | |
|---|---|---|
| 1,942,260 | Scott | Jan. 2, 1934 |
| 2,385,580 | Knox | Sept. 25, 1945 |
| 2,462,020 | Craig | Feb. 15, 1949 |
| 2,707,850 | Dalton et al. | May 10, 1955 |
| 2,889,952 | Claypoole | June 9, 1959 |
| 2,897,389 | Salgo | July 28, 1959 |
| 2,905,843 | Lubszynski | Sept. 22, 1959 |